United States Patent Office 2,824,834
Patented Feb. 25, 1958

2,824,834
ACIDIZING WELLS

Paul H. Cardwell and Louis H. Eilers, Tulsa, Okla., assignors to The Dow Chemical Company, Midland, Mich., a corporation of Delaware No Drawing. Application May 11, 1953
Serial No. 354,416

12 Claims. (Cl. 252—8.55)

The invention relates to the treatment of wells in earth formations. It more particularly concerns an improved composition for and method of acidizing wells particularly those drilled into earth formations which are fractured or vuggy.

In drilling into earth formations which are fractured or vuggy for the purpose of obtaining oil or gas the difficulty arises that the fractures become more or less blocked by the drilling mud circulated in the well during drilling, if not already more or less clogged with materials of one kind or another indigenous to the formation such as carbonate deposits. These fracture-clogging deposits seal the pores of the opposed faces of the productive formation defining the walls of the fractures or vuggs, thereby hindering the production of fluid from the well. Attempts to remove these flow obstructing deposits from fractures and vuggs by injections of hydrochloric acid solutions, as is conventional well acidizing operations, are not desirably effective. In the usual acidizing operation, the acid attacks and dissolves away the formation mainly at the place at which the acid enters, although more or less of the acid also permeates to a limited extent the innumerable interconnected pores or interstitial spaces and becomes spent therein. As a result, the acid is more or less ineffectively expended close to the well hole forming cavernous openings and does not deeply enter and clean out the pores of the formation in communication with the fractures.

It is an object of the present invention to provide an acidizing composition for and method of acidizing wells particularly those in fractured or vuggy formations, which penetrates deeply into fractures and vuggs and therein effectively removes clogging deposits without becoming ineffectively expended close to the well hole. Other objects and advantages will become apparent as the description of the invention proceeds.

The invention is predicated upon the discovery that by including in the aqueous hydrochloric acid solution, with which the formation penetrated by the well is acidized, from 0.05 to 1.0 percent by weight of certain watersoluble gums, the gums being previously moistened with a water-insoluble liquid dispersible in the acid solution, the acid solution no longer attacks and merely dissolves the formation to form cavernous openings close to the point of injection but instead penetrates deeply into the fractures or vuggs communicating with the well hole effectively cleaning them.

The invention then consists of the improved acid composition and method of acidizing wells herein fully described and particularly pointed out in the claims.

In carrying out the invention, various water-soluble gums may be used which are effective for the purpose for example karaya, carrageenin (Irish moss), psyllium seed, ghatti, alginate, tragacanth, pershir, and shiraz. Before dispersal in the acid solution, which may have a concentration of HCl of 2 to 25 percent, although preferred concentrations are from 10 to 20 percent, the gum is moistened or wetted with a suitable non-aqueous water-insoluble liquid. Suitable non-aqueous liquids are those which wet the gum and are inert both to the gum and the aqueous hydrochloric acid. Examples of these liquids are petroleum oil, especially the fractions boiling in the range from petroleum ether to the lubricating oils. Specific examples of suitable petroleum fractions are kerosene, benzine, and SAE No. 30 motor lubricating oil. The liquid chlorinated hydrocarbons having molecular weights of 85 to 300 form another class of suitable non-aqueous liquids. Still another class of organic liquids which wet the gums and are water-insoluble or nearly so and inert to the gums that may be used are alcohols and ketones having carbon atom to oxygen atom ratios of 5 to 11 and molecular weights in the range of 85 to 175. Specific examples of such liquids are amyl alcohol and diethyl ketone.

The non-aqueous liquid is used in an amount sufficient to moissten or wet the gum so that on stirring the non-aqueous-liquid-wetted gum into the hydrochloric acid solution the gum becomes uniformly dispersed therein without gelling or balling up as it does in the absence of prior wetting by the non-aqueous liquid. The amount of non-aqueous liquid to use is not sharply critical and readily determined by trial. If insufficient of the non-aqueous liquid be used, the gum balls up and forms gellied masses not uniformly dispersed in the acid and these masses block the flow of the acid solution into the earth formation. In determining the amount of non-aqueous liquid to use, it becomes evident in trial tests that a wide range of proportions will produce a non-aqueous liquid gum-mixture which is readily dispersible in the hydrochloric acid without gelling and balling up provided a certain minimum amount of the liquid is used. The minimum varies with the kind of gum as well as the kind of non-aqueous liquid. For example, we have found that a given weight of gum karaya may be wetted and rendered uniformly dispersible in the acid solution by an amount of kerosene which is about 50 to 70 percent of the weight of the gum. Larger amounts may be used such as up to several times, e. g. 500 percent of the weight of the gum. When an excessive amount of the non-aqueous liquid is used, much of it washes off the gum as the liquid moistened gum is dispersed in the acid solution forming a second liquid phase in the acid solution which separates on standing. When the non-aqueous liquid is relatively light compared to the acid solution, the non-aqueous liquid rises to the top forming a floating layer which is of no known value in the subsequent use of the acid solution in the treatment of the earth formation. Hence, as a guide in determining the maximum amount of non-aqueous liquid with which to wet the gum a series of mixtures of gum and non-aqueous liquid may be made using increasing amounts of the non-aqueous liquid until a proportion is found which is under that producing a second liquid phase on settling the mixture after dispersion. In general, amounts of non-aqueous liquids which are between the extremes of insufficiency, as evidenced by balling up and gelling, and excessive amounts, as evidenced by stratification into two liquid phases on settling, are used. For example, a generally suitable amount of the non-aqueous liquid is a weight about equal to the weight of the gum used.

Dispersal of the wetted or moistened gum in acid solution may be effected in any convenient maner as by simply stirring the acid solution while adding the non-aqueous liquid-wetted gum thereto and continuing the stirring, if necessary, to uniformly disperse the gum in the acid solution.

The addition of the non-aqueous liquid-wetted gum to the acid solution when brought into contact with the walls of the fractures in the earth formations penetrated by the well may be characterized as an etching action on the surface of the walls defining the fractures or vuggs. As already explained, the action of the non-aqueous liquid-wetted gum-containing solution is distinctly different from that of the conventional gum-free acid. The difference in the action can be understood from the following comparative laboratory experiments on artificially made limestone fractures loaded with drilling mud, the artificial fracture being made by cutting a limestone block in two and then bringing the two pieces close together face to face at the cut surfaces. In these experiments, rectangular blocks of limestone (99% $CaCO_3$) each 4" thick, 16" high, and 2 feet long were used. Each block was sawed in two, the saw cut being perpendicular to the broad faces of the block. The cut followed a zigzag course from one end of the block to the other making a total length of cut of 42 inches. The two saw cut surfaces so made were spaced from each other vis-a-vis 1/25 inch apart and cemented together with a pair of bands of plaster of Paris cement each ½ inch wide extending the full length of the cut surfaces adjacent to the outer faces of the block. In this way, a simulated crack 3 inches wide was left between the two pieces of the block extending the length of the cut and sealed along the sides. The volume of space in the simulated crack was about 70 to 80 milliliters. A passageway was drilled into each end of the so-formed simulated crack a short distance into the block to provide access to the crack and a pipe nipple was sealed into each passage. In preparation for a test, the simulated crack was filled with a synthetic drilling mud formed of water, red clay, and bentonite mixed in the following proportions: water 1300 grams, red clay (55% montmorillonite, 25% vermiculite, balance undetermined) 200 grams, and bentonite 50 grams. This was run into the crack through one of the nipples from an elevated vessel. After filling the crack with drilling mud, the acidizing solution to be tested was run into the crack from one end at the rate of 100 milliliters per minute for 5 minutes using 10 to 25 pounds per square inch pressure. The temperature of the acidizing solution and the limestone block was about 80° F. Acidizing solution, if any, emerging from the opposite end of the crack was collected and its HCl content determined. After injecting the acid into the crack, the two pieces of block were separated and the surfaces defining the crack were examined to determine the attack on the limestone, the removal action of the acid on the drilling mud, as well as the distance of travel of the acidizing solution into the crack. Five tests were run of the foregoing type using a freshly cut block of the same limestone for each test and aqueous hydrochloric acid containing 15 percent of HCl. The data obtained are set forth in the following table:

From the tabulated data, it is manifest that the gum-free acid solution becomes spent rapidly in the crack between the two portions of the block close to the point of entry and the acid solution does not travel a significant distance along the crack before becoming completely expended without removing much drilling mud. In comparison, by the addition of the non-aqueous liquid-wetted-water-soluble gum to the acid solution in accordance with the invention, the action of the acid is markedly altered especially when the amount used is greater than 0.1 but less than 1.0 percent of the weight of the acid solution. Some beneficial effect is obtained with as little as 0.1 percent and as much as 1.0 percent but the maximum benefit appears in the range of 0.25 to 0.5 percent of water-soluble gum.

If desired, a corrosion inhibitor may be included in the acid solution to protect the metal parts of the well from attack by the acid. In addition, there may be included an emulsion breaking agent to prevent the possibility of the acid solution forming undesirable emulsions with oil in oil-producing formations.

In carrying out the acidization of a well, the charge of acid solution containing dispersed non-aqueous liquid-wetted gum is introduced into the well and thence into the earth formation penetrated by the well bore using pressure, if necessary, to secure penetration of the charge into the formation. The volume of the charge is not critical. 1000 to 2000 gallons suffices for the usual well but other amounts may be used. After the injection of the charge has been made, the well may be put back into production as in restoring a well to production after a conventional acidization.

This application is a continuation-in-part of our copending application Serial No. 272,269, filed February 18, 1952, now abandoned.

We claim:

1. In a method of acidizing an earth formation penetrated by a well bore the step which consists in introducing into the well and thence into the earth formation a charge of hydrochloric acid solution containing 2 to 25 percent of HCl having dispersed therein between 0.1 and 1.0 percent of a water-soluble gum selected from the group consisting of karaya, carrageenin (Irish moss), psyllium seed, ghatti, alginate, tragacanth, pershir, and shiraz, said gum before dispersal in the acid solution being moistened with a water-insoluble non-aqueous liquid inert to the gum and to the acid solution.

2. In a method according to claim 1 in which the amount of water-soluble gum is 0.25 to 0.5 percent.

3. In a method according to claim 1 in which the water-soluble gum is karaya.

4. In a method according to claim 1 in which the water-soluble gum is carrageenin (Irish moss).

5. In a method according to claim 1 in which the water-soluble gum is psyllium seed.

6. In a method according to claim 1 in which the water-soluble gum is tragacanth.

Table

| Test No. | Gum [1] | | Strength of acid emerging from end of crack, if any | Length of crack etched by the acid, inches | Remarks |
|---|---|---|---|---|---|
| | Name | Percent | | | |
| 1 | No gum | | 0.0% HCl | 12 | Acid spent rapidly causing deep pits in first 8 inches of crack. |
| 2 | Karaya | 0.1 | 0.0% HCl | 36 | Surface of block at crack partially etched, most of drilling mud removed. |
| 3 | ---do--- | 0.25 | 2.2% HCl | 42 | Almost all surface of block at crack etched with good removal of drilling mud. |
| 4 | ---do--- | 0.5 | 3.6% HCl | 42 | All surface of block at crack etched and drilling mud removed. |
| 5 | ---do--- | 1.0 | 5.3% HCl | 42 | Surface of block at crack partially etched and drilling mud partially removed. |

[1] Wetted with an equal weight of non-aqueous liquid before dispersal in the acid solution.

7. In a method according to claim 1 in which the water-soluble gum is pershir.

8. In a method according to claim 1 in which the non-aqueous liquid is a liquid petroleum fraction boiling in the range between and including kerosene and lubricating oil.

9. In a method according to claim 1 in which the non-aqueous liquid is kerosene.

10. A composition for acidizing wells comprising an aqueous hydrochloric acid solution containing 2 to 25 percent of HCl, said solution having dispersed therein a water-soluble gum in amount between 0.1 and 1.0 percent by weight selected from the group consisting of karaya, carrageenin (Irish moss), psyllium seed, ghatti, alginate, tragacanth, pershir, and shiraz, said gum having its particles wetted with a non-aqueous liquid insoluble in the acid solution in the amount of at least 50 percent of the weight of the gum.

11. A composition according to claim 10 in which the non-aqueous liquid is a petroleum fraction boiling in the range between and including kerosene and lubricating oil.

12. A composition according to claim 10 in which the non-aqueous liquid is kerosene and the water-soluble gum is karaya.

References Cited in the file of this patent
UNITED STATES PATENTS

| | | |
|---|---|---|
| 2,412,282 | Nelson | Dec. 10, 1946 |
| 2,445,226 | Landers | July 13, 1948 |
| 2,596,137 | Fast | May 13, 1952 |